(12) United States Patent
Garcia Azorero et al.

(10) Patent No.: US 11,923,993 B2
(45) Date of Patent: Mar. 5, 2024

(54) SUBSCRIPTION TO CHANGES IN POLICY DATA

(71) Applicant: Telefonaktiebolaget LM Ericsson (publ), Stockholm (SE)

(72) Inventors: Fuencisla Garcia Azorero, Madrid (ES); Antonio Iniesta Gonzalez, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 261 days.

(21) Appl. No.: 17/599,934

(22) PCT Filed: Mar. 13, 2020

(86) PCT No.: PCT/EP2020/056830
§ 371 (c)(1),
(2) Date: Sep. 29, 2021

(87) PCT Pub. No.: WO2020/200695
PCT Pub. Date: Oct. 8, 2020

(65) Prior Publication Data
US 2023/0171347 A1    Jun. 1, 2023

(30) Foreign Application Priority Data
Mar. 29, 2019   (EP) ..................................... 19382231

(51) Int. Cl.
*H04W 8/20*       (2009.01)
*H04L 12/14*      (2006.01)
(Continued)

(52) U.S. Cl.
CPC .......... *H04L 12/1407* (2013.01); *H04L 67/51* (2022.05); *H04M 15/66* (2013.01); *H04W 4/24* (2013.01); *H04W 8/20* (2013.01)

(58) Field of Classification Search
CPC .... H04L 12/1407; H04L 67/51; H04M 15/66; H04W 4/24; H04W 8/20
(Continued)

(56) References Cited

U.S. PATENT DOCUMENTS

| 2018/0352050 | A1  | 12/2018 | Li et al. |
| 2019/0053104 | A1  | 2/2019  | Qiao et al. |
| 2019/0261260 | A1* | 8/2019  | Dao ................. H04W 36/0033 |

FOREIGN PATENT DOCUMENTS

| CN | 103460642 A | 12/2013 |
| CN | 103988570 A | 8/2014 |

(Continued)

OTHER PUBLICATIONS

International Search Report and Written Opinion dated May 25, 2020 for International Application No. PCT/EP2020/056830 filed Mar. 13, 2020, consisting of 10-pages.
(Continued)

*Primary Examiner* — Joel Ajayi
(74) *Attorney, Agent, or Firm* — Christopher & Weisberg, P.A.

(57) ABSTRACT

The present disclosure addresses missing procedures on subscription to notification of subscription data changes in current standards and provides for amending the "Policy Data Subscription" data structure to indicate that the URI of the "Policy Data Subscriptions" resource and the URI of the "Individual Policy Data Subscription" resource are excluded from the list of resources for which a modification triggers a notification. The present disclosure also provides for new attributes to be included in the "Policy Data Change Notification" data type.

12 Claims, 12 Drawing Sheets

(51) Int. Cl.
  *H04L 67/51* (2022.01)
  *H04M 15/00* (2006.01)
  *H04W 4/24* (2018.01)

(58) Field of Classification Search
  USPC .................................................. 455/432.1
  See application file for complete search history.

(56) References Cited

FOREIGN PATENT DOCUMENTS

| CN | 108702723 A | 10/2018 |
|---|---|---|
| WO | 20120142437 A1 | 10/2012 |
| WO | 2013060363 A1 | 5/2013 |
| WO | 2018166437 A1 | 9/2018 |

OTHER PUBLICATIONS

3GPP TS 23.501 V15.5.0; 3rd Generation Partnership Project; Technical Specification Group Services and System Aspects; System Architecture for the 5G System; Stage 2 (Release 15); Mar. 2019, consisting of 241-pages.

3GPP TS 23.503 V15.5.0; 3rd Generation Partnership Project; Technical Specification Group Services and System Aspects; Policy and Charging Control Framework for the 5G System; Stage 2 (Release 15); Mar. 2019, consisting of 78-pages.

3GPP TS 29.512 V15.3.0; 3rd Generation Partnership Project; Technical Specification Group Core Network and Terminals; 5G System; Session Management Policy Control Service; Stage 3 (Release 15); Mar. 2019, consisting of 141-pages.

3GPP TS 29.513 V15.2.0; 3rd Generation Partnership Project; Technical Specification Group Core Network and Terminals; 5G System; Policy and Charging Control signalling flows and QoS parameter mapping; Stage 3 (Release 15); Dec. 2018, consisting of 85-pages.

3GPP TS 23.502 V15.5.1; 3rd Generation Partnership Project; Technical Specification Group Services and System Aspects; Procedures for the 5G System; Stage 2 (Release 15); Apr. 2019, consisting of 354-pages.

3GPP TS 29.525 V15.1.0; 3rd Generation Partnership Project; Technical Specification Group Core Network and Terminals; 5G System; UE Policy Control Service; Stage 3 (Release 15); Mar. 2019, consisting of 42-pages.

International Search Report and Written Opinion dated Mar. 20, 2020 for International Application No. PCT/EP2020/052924 filed Feb. 6, 2020, consisting of 9-pages.

Japanese Decision to Grant and English machine translation dated Feb. 7, 2023 for Application No. 2021-557747, consisting of 5 pages.

Indian Examination Report dated Feb. 27, 2023 for Application No. 202117040800, consisting of 6 pages.

Chinese Office Action and English Summary dated Feb. 23, 2023 for Application No. 202080024716.9, consisting of 13 pages.

3GPP TSG-CT Meeting #82 CP-183174; Change Request; Title: PLMN ID as key for UE data sets; Source to TSG: Nokia, Nokia Shanghai-Bell, Huawei, Ericsson; Revision of C3-187635; Location and Date: Sorrento, Italy, Dec. 10-11, 2018, consisting of 20 pages.

Japanese Office Action and English Summary dated Oct. 25, 2022 for Application No. 2021-557747, consisting of 6 pages.

Chinese Office Action and English Translation dated Jul. 15, 2023 for Application No. 202080024577.X, consisting of 14-pages.

3GPP TS 29.519 V15.3.0; 3rd Generation Partnership Project; Technical Specification Group Core Network and Terminals; 5G System; Usage of the Unified Data Repository service for Policy Data, Application Data and Structured Data for Exposure; Stage 3 (Release 15); Mar. 2019, consisting of 105 pages.

* cited by examiner

| Attribute name | Data type | P | Cardinality | Description |
|---|---|---|---|---|
| ... | ... | ... | ... | ... |
| monitoredResourceUris | array(Uri) | M | 1..N | A set of URIs that identify the resources defined in table 5.2.2-1 for which a modification triggers a notification. (NOTE) |
| ... | ... | ... | ... | ... |
| NOTE: A modification in the PolicyDataSubscriptions resource and in the IndividualPolicyDataSubscription resource shall not trigger a notification. The resource URI of the IndividualPolicyDataSubscription resource and the resource URI of the PolicyDataSubscriptions resource shall not be included in the "monitoredResourceUris" attribute. |||||

130 — monitoredResourceUris
132 — NOTE

Fig. 13

| Attribute name | Data type | P | Cardinality | Description |
|---|---|---|---|---|
| ... | ... | ... | ... | ... |
| plmnUePolicySet | UePolicySet | O | 0..1 | PLMN UE Policy Set, if changed and notification was requested. |
| ... | ... | ... | ... | ... |
| opSpecData | OperatorSpecificDataContainer | O | 0..1 | Operator Specific Data, if changed and notification was requested. |
| ... | ... | ... | ... | ... |
| plmnId | PlmnId | C | 0..1 | Represents the PLMN identifier. It shall only be present when the "plmnUePolicySet" attribute is present. |
| NOTE: At least one of the "amPolicyData", "uePolicySet", "smPolicyData", "usageMonData", "sponsorConnectivityData", "bdtData", "opSpecData" or "plmnUePolicySet" shall be present. |||||

140 — plmnUePolicySet
142 — opSpecData
144 — plmnId
146 — NOTE

Fig. 14

| Resource name | Resource URI | HTTP method or custom operation | Description |
|---|---|---|---|
| ... | ... | ... | ... |
| PolicyDataSubscriptions | {apiRoot}/nudr-dr/{apiVersion}/policy-data/subs-to-notify | POST | Create a subscription to receive notification of policy data changes. |
| IndividualPolicyDataSubscription | {apiRoot}/nudr-dr/{apiVersion}/policy-data/subs-to-notify/{subsId} | PUT | Modify a subscription to receive notification of policy data changes. |
|  |  | DELETE | Delete the subscription identified by {subsId}. |
| ... | ... | ... | ... |

150 — PolicyDataSubscriptions
152 — IndividualPolicyDataSubscription

Fig. 15

Prior Art

SUBSCRIPTION TO CHANGES IN POLICY DATA

CROSS-REFERENCE TO RELATED APPLICATIONS

This application is a Submission Under 35 U.S.C. § 371 for U.S. National Stage Patent Application of International Application No.: PCT/EP2020/056830, filed Mar. 13, 2020 entitled "SUBSCRIPTION TO CHANGES IN POLICY DATA," which claims priority to European Application No.: 19382231.9, filed Mar. 29, 2019, the entireties of both of which are incorporated herein by reference.

TECHNICAL FIELD

The present invention generally relates to subscription to notification on Policy Data changes; and, more specifically, the invention relates to handling of notifications about Operator Specific Data changes, and UE Policy Set changes in a PLMN.

BACKGROUND

3GPP TS 29.519 v15.3.0 discloses subscription to notifications of policy data changes. A so-called 'HTTP POST' method is defined for notification of policy data changes, which is sent from a Unified Data Repository (UDR) toward a Uniform Resource Identifier (URI) provided by a Policy Control Function (PCF) during a subscription procedure.

The subscription procedure is performed by triggering a HTTP POST request toward a so-called PolicyDataSubscriptions collection resource in order to create a subscription, or by triggering a HTTP PUT request toward a so-called IndividualPolicyDataSubscription document resource in order to modify a subscription. The HTTP POST request and the HTTP PUT request include a request body that contains the attributes defined in Table I, which corresponds to Table 5.4.2.10-1 in 3GPP TS 29.519, on definition of type PolicyDataSubscription as follows.

TABLE I

| Attribute name | Data type | P | Cardinality | Description |
|---|---|---|---|---|
| notificationUri | Uri | M | 1 | URI provided by the NF service consumer indicating where to receive the subscribed notifications from the UDR. |
| monitoredResourceUris | array(Uri) | M | 1 . . . N | A set of URIs that identify the resources for which a modification triggers a notification. |
| supportedFeatures | SupportedFeatures | C | 0 . . . 1 | Used to negotiate the applicability of the optional features. This attribute shall be provided in the POST request and in the response of successful resource creation. |

The notification procedure is triggered when a modification in any of the resources included in the so-called monitoredResourceUris attribute occurs in the UDR.

The request body of the HTTP POST request sent from the UDR toward the PCF to notify about a policy data change is defined below in Table II, which corresponds to Table 5.4.2.11-1 in 3GPP TS 29.519, on definition of type PolicyDataChangeNotification.

TABLE II

| Attribute name | Data type | P | Cardinality | Description |
|---|---|---|---|---|
| amPolicyData | AmPolicyData | O | 0 . . . 1 | Access and Mobility Policy Data, if changed and notification was requested. |
| uePolicySet | UePolicySet | O | 0 . . . 1 | UE Policy Set, if changed and notification was requested. |
| smPolicyData | SmPolicyData | O | 0 . . . 1 | Session Management Policy Data, if changed and notification was requested. |
| usageMonData | UsageMonData | O | 0 . . . 1 | Usage Monitoring Data, if changed and notification was requested. |
| sponsorConnectivityData | SponsorConnectivityData | O | 0 . . . 1 | Sponsor data connectivity profile information, if changed and notification was requested. |
| bdtData | BdtData | O | 0 . . . 1 | Background Data Transfer Data, if changed and notification was requested. |
| ueId | VarUeId | C | 0 . . . 1 | Represents the UE subscription identifier SUPI or GPSI. It shall only be present when the "amPolicyData", "uePolicySet", "smPolicyData", and/or "usageMonData" attribute is present. |
| sponsorId | string | C | 0 . . . 1 | Represents the sponsor identity. It shall only be present when the "sponsorConnectivityData" attribute is present. |

TABLE II-continued

| Attribute name | Data type | P | Cardinality | Description |
| --- | --- | --- | --- | --- |
| bdtRefId | string | C | 0 ... 1 | Represents the BDT reference identifier. It shall only be present when the "bdtData" attribute is present. |
| usageMonId | string | C | 0 ... 1 | Represents the unique identifier of the individual SM Policy usage monitoring resource. It shall only be present when the "usageMonData" attribute is present. |

NOTE:
At least one of the "amPolicyData", "uePolicySet", "smPolicyData", "usageMonData", "sponsorConnectivityData", or "bdtData" shall be present.

3GPP TS 29.513 v15.2.0 discloses call flows where PCF subscribes with UDR to notification on policy data changes. This TS 29.513 defines the end-to-end flows for Policy and Charging Control (PCC) procedures and shows the interactions across different PCC Application Programming Interfaces (APIs).

Most of the PCC APIs behave similarly when it comes to subscription with UDR for notification on policy data changes. For the purpose of this invention, the so-called Npcf_UEPolicyControl and Npcf_SMPolicyControl services have a relevance.

The flow illustrated in FIG. 1, which is based on FIG. 5.2.1-1 in 3GPP TS 29.513, describes interactions that will be later on impacted by the solution described throughout this specification. This procedure concerns both roaming and non-roaming scenarios. In a home routed roaming case, the PCF acts as the H-PCF. In an LBO roaming case, the PCF acts as the V-PCF, and the actions 2 to 5 are skipped. Actions illustrated in FIG. 1 are discussed in the following.

Action 1. The SMF receives a PDU session establishment request from the UE. The SMF selects the PCF and invokes the Npcf_SMPolicyControl_Create service operation by sending the HTTP POST request toward a so-called SM Policies resource. The request operation provides the SUPI, the PDU session ID, PDU Session Type, DNN, and S-NSSAI, and may provide the GPSI, the Internal Group Identifier, the Access Type, the IPv4 address or the IPv6 network prefix (if available), the PEI if received in the SMF, the User Location Information, the UE Time Zone, Serving Network, RAT type, charging information, the subscribed Session-AMBR and the subscribed default 5QI/ARP, if available. The request operation also includes a Notification URI to indicate to the PCF where to send a notification when the SM related policies are updated.

Actions 2-3. If PCF does not have the subscription data for the SUPI and DNN, the PCF invokes a Nudr_DataRepository_Query service operation to the UDR by sending the HTTP GET request to a so-called SessionManagementPolicyData resource as specified in the 3GPP TS 29.519. The UDR sends an HTTP "200 OK" response to the PCF with the policy control subscription data.

Actions 4-5. In order to request notifications from the UDR on changes in the subscription information, the PCF invokes the Nudr_DataRepository_Subscribe service operation by sending a HTTP POST request toward a so-called PolicyDataSubscriptions resource 150 in prior art FIG. 15. The action 4 has been labelled S-100 to be further referred to. The UDR sends an HTTP "201 Created" response to acknowledge the subscription. Additionally, in order to request notifications from the UDR on changes in the AF influence data, the PCF invokes the Nudr_DataRepository_Subscribe service operation by sending a HTTP POST request to a so-called Influence Data Subscription resource. The UDR sends an HTTP "201 Created" response to acknowledge the subscription.

Action 6. If the PCF determines that a policy decision depends on the status of policy counters available at a Charging Function (CHF), and such reporting is not established for the subscriber, the PCF initiates an Initial Spending Limit Report Retrieval. If policy counter status reporting is already established for the subscriber, and the PCF determines that the statuses of additional policy counters are required, the PCF initiates an Intermediate Spending Limit Report Retrieval.

Action 7. The PCF makes the policy decision to determine the information to be provided.

Action 8. In the case that a Binding Support Function (BSF) is to be used and that either the IP address/prefix or MAC address is available, the PCF invokes a so-called Nbsf_Management_Register service operation by sending a HTTP POST request to create the PDU session binding information for a user equipment (UE) in the BSF.

Action 9. The PCF receives an HTTP "201 Created" response from the BSF with the created binding information.

Action 10. The PCF sends an HTTP "201 Created" response to the SMF with the policy decision determined in action 7. After this action the PCF can subscribe to SMF events associated with the PDU Session.

The sequence of actions illustrated in FIG. 2, which is based on FIG. 5.2.2.2-1 in 3GPP TS 29.513, describes interaction between a Session Management Function (SMF), PCF and CHF for a PCF-initiated SM Policy association modification procedure. This procedure is performed when the PCF decides to modify policy decisions for a PDU session.

Action 1. The PCF receives an internal or external trigger to re-evaluate PCC Rules and policy decision for a PDU Session. Possible external trigger events are: i) the UDR notifies the PCF of a policy subscription change, e.g. change in MPS EPS Priority, MPS Priority Level and/or IMS Signalling Priority, or e.g. change in user profile configuration indicating whether supporting application detection and control; and ii) the CHF provides a Spending Limit Report to the PCF. This action has been labelled S-200 to be further referred to.

Action 2. If the PCF determines that the policy decision depends on the status of policy counters available at the CHF and such reporting is not established for the subscriber, the PCF initiates an Initial Spending Limit Report. If policy counter status reporting is already established for the subscriber, and the PCF decides to modify the list of subscribed policy counters, the PCF sends an Intermediate Spending Limit Report. If the PCF decides to unsubscribe any future status notification of policy counters, it sends a Final Spending Limit Report Request to cancel the request for reporting the change of the status of the policy counters available at the CHF.

Action 3. The PCF makes a policy decision. The PCF can determine that updated or new policy information need to be sent to the SMF.

Action 4. The PCF invokes the Npcf_SMPolicyControl_UpdateNotify service operation by sending the HTTP POST request with a so-called {Notification URI}/update as the resource URI toward the SMF that has previously subscribed. The request operation provides the PDU session ID and updated policies.

Action 5. The SMF sends an HTTP "200 OK" to the PCF.

The sequence of actions illustrated in FIG. 3, which is based on FIG. 5.6.1.3-1 in 3GPP TS 29.513, describes a UE Policy association establishment procedure in a Roaming scenario.

Action 1. An Access and Mobility management Function (AMF) receives a registration request from an access Network (AN). Based on local policy, the AMF decides to establish UE Policy Association with the visited PCF (V-PCF). The AMF invokes the Npcf_UEPolicyControl_Create service operation by sending an HTTP POST request to a so-called UE Policy Associations resource. The request includes parameters as defined in subclause 4.2.2.1 of 3GPP TS 29.525 v15.0.0.

Action 2. The V-PCF invokes the Npcf_UEPolicyControl_Create service operation by sending a HTTP POST request to the UE Policy Association resource to forward the information received from AMF to a home PCF (H-PCF). The request includes the parameters received in action 1. The V-PCF also provides the H-PCF the Notification URI where to send a notification when the policy is updated.

Actions 3-6. These actions are the same as actions 2-5 in subclause 5.6.1.2 of 3GPP TS 29.513. That is, in action 5 labelled S-300 to be further referred to, the H-PCF may request notifications from the home UDR (H-UDR) on changes in the subscription information, and in this case, the H-PCF shall invoke the Nudr_DataRepository_Subscribe service operation by sending an HTTP POST request to the "PolicyDataSubscriptions" resource.

Action 7. The H-PCF determines whether and which UE policy has to be provisioned or updated, as defined in subclause 4.2.2.2.1 of 3GPP TS 29.525, and may determine applicable Policy Control Request Trigger(s).

Action 8. The H-PCF sends an HTTP "201 Created" response to the V-PCF with the decided UE policy and Policy Control Request Trigger(s) if available.

Action 9. The V-PCF invokes Nudr_DataRepository_Query service operation to the UDR by sending an HTTP GET request to a so-called PlmnUePolicySet resource to retrieve the list of UPSIs and its content stored in the visited UDR (V-UDR) for the PLMN ID of this UE. Alternatively, the V-PCF can have this information configured locally. NOTE 1: The UPSI list and content stored/configured for a PLMN ID can be structured according to e.g. location areas (e.g. TAs, PRAs). The V-PCF can then provide UPSIs and its content only if they correspond to the current UE location.

Action 10. The V-UDR sends an HTTP "200 OK" response to the V-PCF with the UE policy information.

Action 11. The V-PCF may request notifications from the V-UDR on changes in UE policy information and, in this case, the PCF shall invoke the Nudr_DataRepository_Subscribe service operation by sending an HTTP POST request to the so-called PolicyDataSubscriptions resource 150 in prior art FIG. 15. This action has been labelled S-310 to be further referred to.

Action 12. The V-UDR sends an HTTP "201 Created" response to acknowledge the subscription from the V-PCF.

Action 13. The V-PCF determines whether and which UE policy has to be provisioned or updated as defined in subclause 4.2.2.2.1 of 3GPP TS 29.525 and may determine applicable Policy Control Request Trigger(s). In addition, the V-PCF checks if the size of determined UE policy exceeds a predefined limit.

NOTE 2: NAS messages from AMF to UE do not exceed the maximum size limit allowed in NG-RAN (PDCP layer), so the predefined size limit in PCF is related to that limitation. If the size is under the limit, then the UE policy information is included in a single Namf_Communication_N1N2MessageTransfer service operation and messages 17 to 20 are thus executed one time. If the size exceeds the predefined limit, the PCF splits the UE policy information in smaller logical independent UE policy information fragments and ensures the size of each is under the predefined limit. Each UE policy information fragment will be then sent in separated Namf_Communication_N1N2MessageTransfer service operations and messages 17 to 20 are thus executed several times, one time for each UE policy information fragment.

Action 14. The V-PCF sends an HTTP "201 Created" response to the AMF with the Policy Control Request Trigger(s) if available.

Action 15. To subscribe to notifications of N1 message for UE Policy Delivery Result, the V-PCF invokes Namf_Communication_N1N2MessageSubscribe service operation to the AMF by sending the HTTP POST method with the URI of the "N1N2 Subscriptions Collection for Individual UE Contexts" resource.

Action 16. The AMF sends an HTTP "201 Created" response to the V-PCF.

Action 17. V-PCF invokes a Namf_Communication_N1N2MessageTransfer service operation to send the policy decided locally in action 13 and to forward the policy received from the H-PCF in action 8.

Action 18. The AMF sends a response to the Namf_Communication_N1N2MessageTransfer service operation.

Action 19. When receiving the UE Policy container for the result of the UE policy, the AMF forwards the response of the UE to the V-PCF using Namf_Communication_N1MessageNotify service operation.

Action 20. The V-PCF sends a response to the Namf_Communication_N1MessageNotify service operation.

Action 21. Upon receipt of the UE Policy container belonging to the H-PLMN in action 18, the V-PCF invokes the so-called Npcf_UEPolicyControl_Update service operation by sending an HTTP POST request to the "Individual UE Policy Association" resource to forward the response of the UE to the H-PCF.

Action 22. The H-PCF sends an HTTP "200 OK" response to the V-PCF.

Actions 23-24. The H-PCF maintains the latest list of UE policy information delivered to the UE and updates UE policy including the latest list of UPSIs and its content in the H-UDR by invoking the Nudr_DataRepository_Update service operation. If there is no UE policy information retrieved in action 4, the H-PCF sends an HTTP PUT request to a so-called UEPolicySet resource, and the UDR sends an HTTP "201 Created" response. Otherwise, the H-PCF sends an HTTP PUT/PATCH request to the "UEPolicySet" resource, and the H-UDR sends an HTTP "204 No Content" response.

The sequence of actions illustrated in FIG. 4, which is based on FIG. 5.6.2.2.3-1 in 3GPP TS 29.513, describes a UE Policy association modification procedure in a Roaming scenario. In this procedure further discussed, if the H-PCF receives a trigger, actions 1 to 4 and 10 to 11 are executed and actions 5 to 8 are omitted; whereas, if the V-PCF receives a trigger, actions 1 to 4 and 10 to 11 are omitted and actions 5 to 8 are executed.

Action 1. The H-PCF receives an external trigger, e.g. the subscriber policy data of a UE is changed, or the PCF receives an internal trigger, e.g. operator policy is changed, to re-evaluate UE policy decision for a UE. This action has been labelled S-400 to be further referred to.

Action 2. The H-PCF makes the policy decision including the applicable updated Policy Control Request Trigger(s) and/or updated UE Policy.

Action 3. The H-PCF invokes the Npcf_UEPolicyControl_UpdateNotify service operation by sending an HTTP POST request to the resource URI "{Notification URI}/update" with the updated UE policy and/or Policy Control Request Trigger(s) if applicable.

Action 4. The V-PCF sends an HTTP "204 No Content" response to the H-PCF.

Action 5. The V-PCF receives an external trigger, e.g. operator policy in the V-UDR for the PLMN ID of this UE is changed, or the V-PCF receives an internal trigger, e.g. local policy is changed, to re-evaluate UE policy decision for a UE. This action has been labelled S-410 to be further referred to.

Action 6. The V-PCF makes the policy decision including the applicable updated Policy Control Request Trigger(s) and/or updated UE Policy. The V-PCF checks if the size of determined UE policy and received UE policy from H-PCF in action 3 exceeds a predefined limit.

Action 7. If the V-PCF needs to update the Policy Control Request Trigger(s) or forward the Policy Control Request Trigger(s) received from the H-PCF in action 3, the V-PCF shall invoke the Npcf_UEPolicyControl_UpdateNotify service operation by sending an HTTP POST request to the resource URI "{Notification URI}/update".

Action 8. The AMF sends an HTTP "204 No Content" response to the PCF.

Action 9. If the V-PCF decided to update the UE policy in action 6 or the V-PCF received the UE Policy in action 3, actions 17-22 as specified in FIG. 3 are executed.

Actions 10-11. If the H-PCF decided to update the UE policy in action 2, conventional actions may be executed.

At present, the PCF as well as any NF service consumer can subscribe to data changes in any Policy Data resource by including the URIs that identify the interested resources in a so-called monitoredResourceUris attribute of the so-called PolicyDataSubscription data structure.

This implies an NF service consumer can subscribe to changes in the resources: i) OperatorSpecificData, with URI: . . . /policy-data/ues/{ueId}/operator-specific-data; ii) PlmnUePolicySet, with URI: . . . /policy-data/plmns/{plmnId}/ue-policy-set; iii) PolicyDataSubscriptions resource: . . . /policy-data/subs-to-notify; and iv) IndividualPolicyDataSubscription resource: . . . /policy-data/subs-to-notify/{subsId}.

Subscription to notification on subscription data changes (by any NF service consumer) is not considered in currently defined procedures, and consequently the PolicyDataChangeNotification data structure does not contain any attribute whose data structure is PolicyDataSubscription. To avoid an inconsistent NF behaviour, the subscription to IndividualPolicyDataSubscription changes should be discouraged.

A number of changes are required; otherwise, the subscription to notifications on policy data changes for the OperatorSpecificData and PlmnUePolicySet resources will never meet the corresponding notification; an NF may misuse the subscription service and subscribe to PolicyDataSubsciptions and IndividualPolicyDataSubscription resources.

In addition, the notifications of changes in the PlmnUePolicySet resource has to be corrected to allow for a proper notification control of the UE Policies changes to all the roamers coming from that PLMN, preventing network overload.

SUMMARY

The present invention is aimed to overcome these drawbacks and provides for amending the "PolicyDataSubscription" data structure to indicate that the URI to the PolicyDataSubscriptions resource as well as the URI to the IndividualPolicyDataSubscription resources are excluded from the list of resources for which a modification triggers a notification.

The present invention also provides for new attributes to be included in the "PolicyDataChangeNotification" data type, such as anyone of: i) "opSpecData" containing a data structure "OperatorSpecificDataContainer"; ii) "plmnId" containing the PLMN Identifier; and iii) "plmnUePolicySet" containing the new UePolicySet values for the given PLMN.

On the other hand, a V-PCF needs to create a subscription to the same resource (PlmnUePolicySet) per every UE Policy association established for a roamer UE from the same PLMN. Consequently, when the UDR detects a change on this resource will send a different notification to the same V-PCF per every roamer subscriber. This implies unnecessary massive signalling from UDR to PCF that should be in some way controlled in the UDR to avoid flooding the PCF with lots of messages.

Regarding the PlmnUePolicySet, the proposed solution reduces the number of subscription from the V-PCF to UDR just having one subscription per PlmnUePolicySet and avoiding additional unnecessary signaling between UDR and PCF, both for subscription/unsubscription and also for potential notifications upon changes of this data.

To protect against the potential increase in signalling load, careful consideration of the network load is recommended for the update of UE Policies to the visiting roamers from a PLMN whose UePolicySet values changed, e.g. limiting the number of visiting UEs subject to simultaneous updates and distributing the whole base of visited UEs from the modified PLMN in a dispersion interval.

Apart from that, the inventors have recognized that subscription to notification on data changes in the OperatorSpecificData resource requires the data structure for Operator Specific Information being supported in the PolicyDataChangeNotification data structure.

Since, typically, data changes would affect individually an OperatorSpecificDataContainer of the map of containers included in the OperatorSpecificData resource, the proposal is that the notification includes only the updated container instead of the complete map. Multiple simultaneous changes on different containers may trigger multiple separated notifications.

Subscription to notification on data changes in the resource PlmnUePolicySet requires the corresponding "plmnId" identifier in the PolicyDataChangeNotification data structure, and also requires a new attribute "plmnUePolicySet" attribute to notify about the new UePolicySet values. Though the "uePolicySet" attribute could be used to encode the changes in the PlmnUePolicySet resource, reusing it may create ambiguity and lead to misinterpretations and mistakes when both, the "ueId" and "plmnId" attributes are included in the PolicyDataChangeNotification data structure. Thus, it is proposed to use a new attribute "plmnUePolicySet".

The present specification provides for an enhanced definition of the subscription with UDR to notifications of changes in Policy Data, which allows to meet the notifications for the complete set of UDR resources for Policy Data control. More efficient interaction for the consumer of the Nudr_DataRepository_Subscribe service operation specifically when addressing the OperatorSpecificData resource, what results in an optimal use of NF service consumer internal resources. Reduction of unnecessary signalling between PCF/UDR for both subscription/unsubscription to changes on PlmnUePolicySet UDR resource and also potential notifications.

In an embodiment, when a PCF receives the establishment of an AMF, SMF or UE Policy association, the PCF subscribes to notifications on OperatorSpecificData in the UDR.

In an embodiment, when a change on any one of the items in the map of OperatorSpecificData for a UE happens in the UDR and a PCF previously subscribed to changes for this resource, the UDR sends a notification to that PCF just including the item in the OperatorSpecificData that has changed.

In an embodiment, at PCF start up or due to O&M triggers or when a UE Policy association request is received in the (V-)PCF and there is no subscription to PlmnUePolicySet resource for the related PLMN yet, the PCF subscribes to notifications on PlmnUePolicySet resource(s) in the UDR.

In an embodiment, when a change on a PlmnUePolicySet resource for a PLMN happens in the UDR and a PCF previously subscribed to changes for this resource the UDR sends a notification to that PCF. The PCF then, identifies the UE Policy associations stored in the PCF for the UEs (roamers) that belong to the notified PLMN, calculates the new UE Policies to deliver to each roamer due to the changes notified by the UDR, and notifies every roamer considering a time dispersion interval to avoid overloading the network.

An advantage of this proposal is the enhanced definition of the subscription with UDR to notifications of changes in Policy Data, which allows to meet the notifications for the complete set of UDR resources for Policy Data control.

Another advantage is the more efficient interaction for the consumer of the Nudr_DataRepository_Subscribe service operation specifically when addressing the OperatorSpecificData resource, what results in an optimal use of NF service consumer internal resources.

Still a further advantage is the reduction of unnecessary signalling between PCF/UDR for both subscription/unsubscription to changes on PlmnUePolicySet UDR resource and also potential notifications.

BRIEF DESCRIPTION OF THE DRAWINGS

The features, objects and advantages of the invention will become apparent by reading this description in conjunction with the accompanying drawings, in which:

FIG. 13 illustrates some amendments proposed in this specification for the definition of type PolicyDataSubscription, and which are extracted from Table III further discussed.

FIG. 14 illustrates some amendments proposed in this specification for the definition of type PolicyDataChangeNotification, and which are extracted from Table IV further discussed.

FIG. 15 illustrates some resource URI relevant for embodiments in this specification and extracted from the prior art Table 5.2.2-1 in 3GPP TS 29.519 v15.3.0.

DETAILED DESCRIPTION

Figure 1:
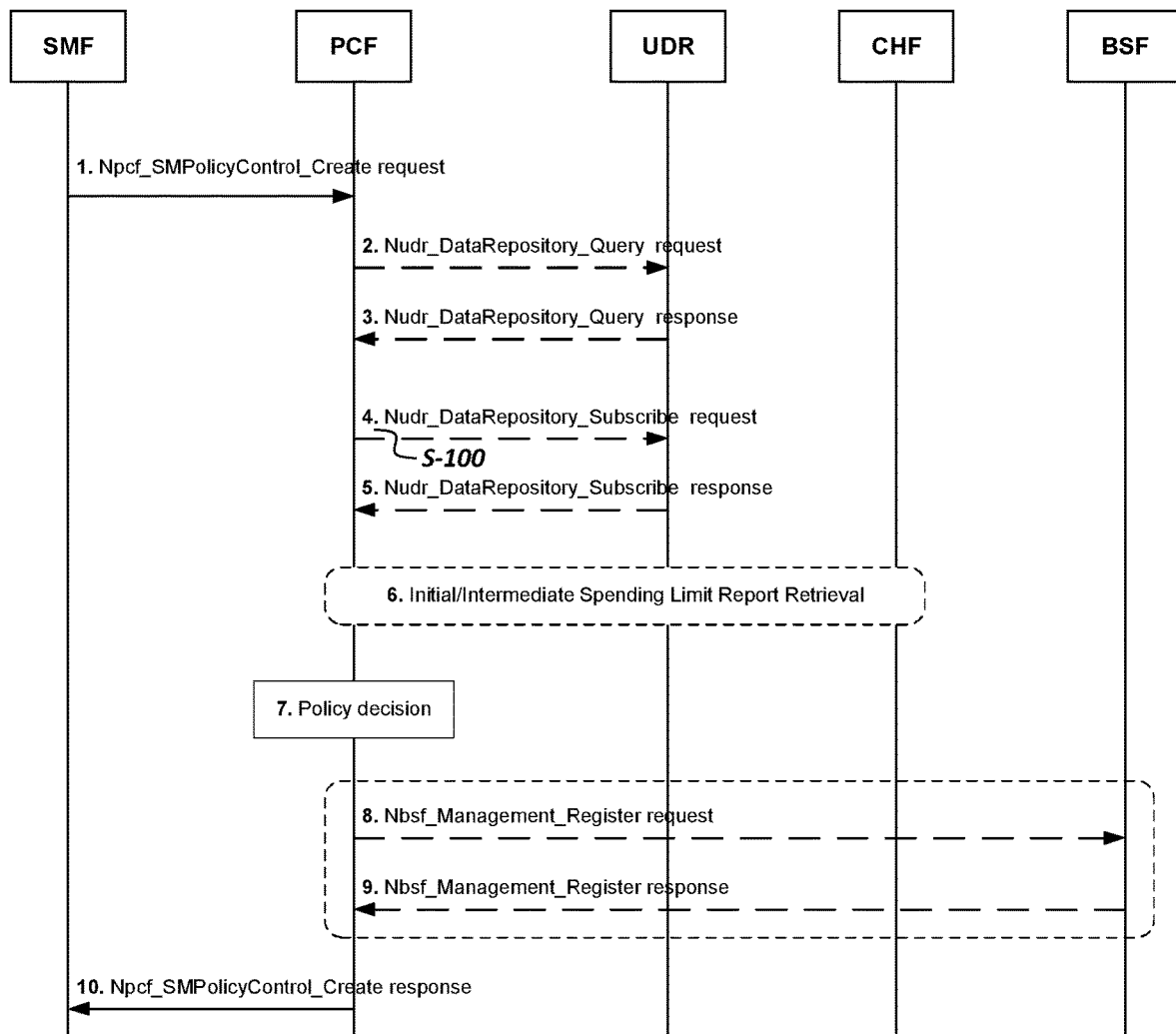
FIG. 1 illustrates a sequence of actions carried out during an SM Policy association establishment procedure.
Figure 2:
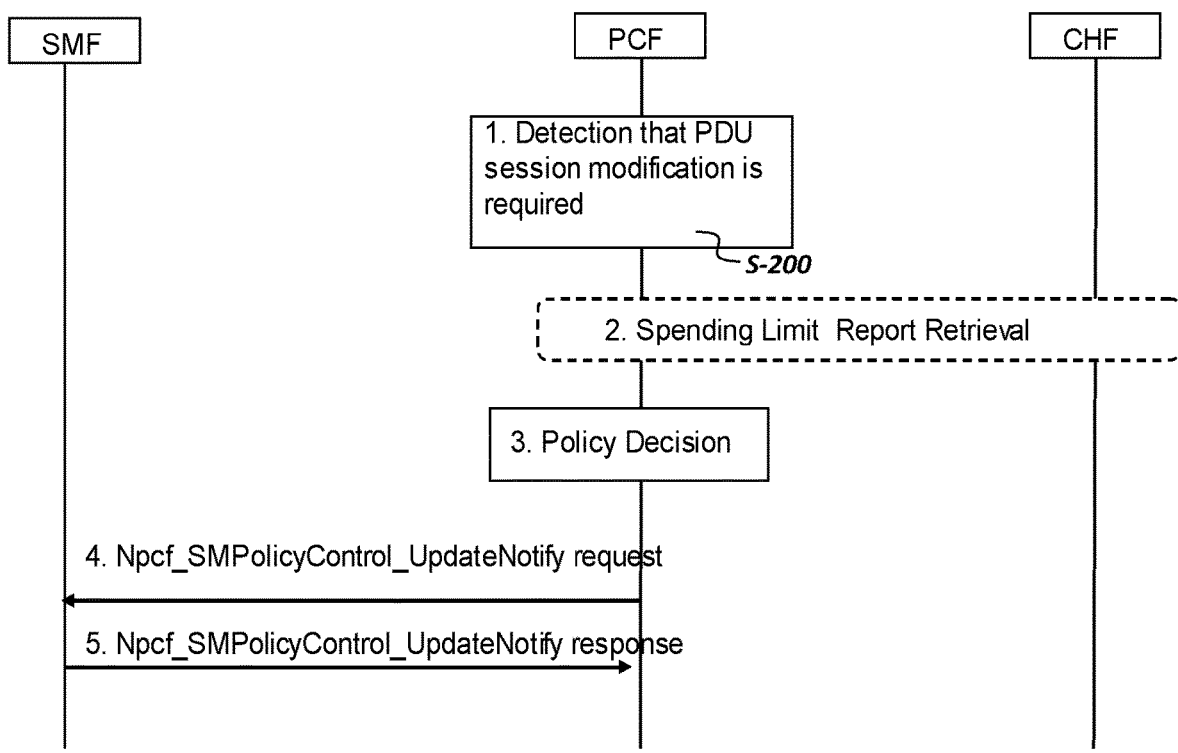
FIG. 2 illustrates a sequence of actions carried out during an SM Policy association modification procedure.

The following describes currently preferred embodiments of amendments in data structures, related to the Subscription currently specified in 3GPP TS 29.519 v15.3.0 and Notification flows currently specified in 3GPP TS 29.513 v15.2.0, as well as apparatuses and methods of optimizing subscription to changes in policy data.

Thus, the definition of type PolicyDataSubscription, discussed above with reference to Table I, is proposed to be amended as shown in Table III below.

TABLE III

| Attribute name | Data type | P | Cardinality | Description |
| --- | --- | --- | --- | --- |
| notificationUri | Uri | M | 1 | URI provided by the NF service consumer indicating where to receive the subscribed notifications from the UDR. |
| monitoredResourceUris | array(Uri) | M | 1 . . . N | A set of URIs that identify the resources defined in table 5.2.2-1 for which a modification triggers a notification. (NOTE) |
| supportedFeatures | SupportedFeatures | C | 0 . . . 1 | Used to negotiate the applicability of the optional features. This attribute shall be provided in the POST request and in the response of successful resource creation. |

(NOTE):
A modification in the PolicyDataSubscriptions resource and in the IndividualPolicyDataSubscription resource shall not trigger a notification. The resource URI of the IndividualPolicyDataSubscription resource and the resource URI of the PolicyDataSubscriptions resource shall not be included in the "monitoredResourceUris" attribute.

Likewise, the definition of type PolicyDataChangeNotification, discussed above with reference to Table II, is proposed to be amended as shown in Table IV below.

TABLE IV

| Attribute name | Data type | P | Cardinality | Description |
| --- | --- | --- | --- | --- |
| amPolicyData | AmPolicyData | O | 0 . . . 1 | Access and Mobility Policy Data, if changed and notification was requested. |
| uePolicySet | UePolicySet | O | 0 . . . 1 | UE Policy Set, if changed and notification was requested. |
| plmnUePolicySet | UePolicySet | O | 0 . . . 1 | PLMN UE Policy Set, if changed and notification was requested. |
| smPolicyData | SmPolicyData | O | 0 . . . 1 | Session Management Policy Data, if changed and notification was requested. |
| usageMonData | UsageMonData | O | 0 . . . 1 | Usage Monitoring Data, if changed and notification was requested. |
| sponsorConnectivityData | SponsorConnectivityData | O | 0 . . . 1 | Sponsor data connectivity profile information, if changed and notification was requested. |
| bdtData | BdtData | O | 0 . . . 1 | Background Data Transfer Data, if changed and notification was requested. |
| opSpecData | OperatorSpecificDataContainer | O | 0 . . . 1 | Operator Specific Data, if changed and notification was requested. |
| ueId | VarUeId | C | 0 . . . 1 | Represents the UE subscription identifier SUPI or GPSI. It shall only be present when the "amPolicyData", "uePolicySet", "smPolicyData", and/or "usageMonData" attribute is present. |
| sponsorId | string | C | 0 . . . 1 | Represents the sponsor identity. It shall only be present when the "sponsorConnectivityData" attribute is present. |
| bdtRefId | string | C | 0 . . . 1 | Represents the BDT reference identifier. It shall only be present when the "bdtData" attribute is present. |
| usageMonId | string | C | 0 . . . 1 | Represents the unique identifier of the individual SM Policy usage monitoring resource. It shall only be present when the "usageMonData" attribute is present. |
| plmnId | PlmnId | C | 0 . . . 1 | Represents the PLMN identifier. It shall only be present when the "plmnUePolicySet" attribute is present. |

NOTE:
At least one of the "amPolicyData", "uePolicySet", "smPolicyData", "usageMonData", "sponsorConnectivityData", "bdtData", "opSpecData" or "plmnUePolicySet" shall be present.

Figure 5:
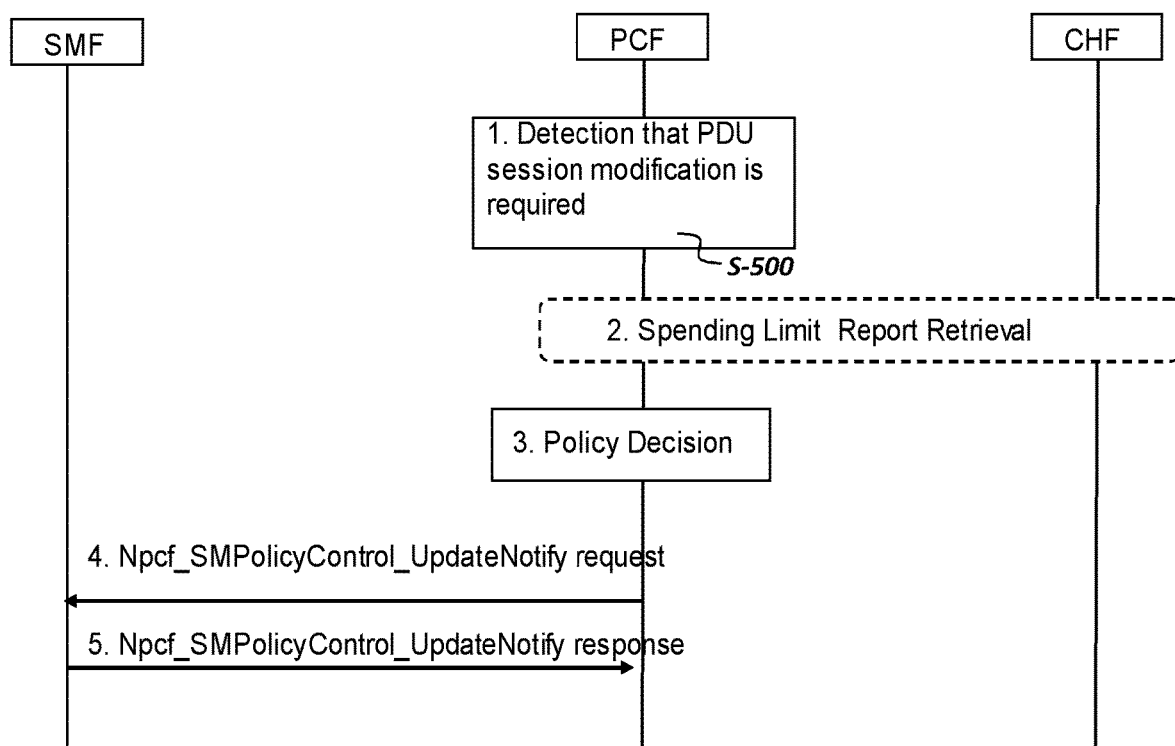
FIG. 5 illustrates an exemplary sequence of actions carried out during a PCF-initiated SM Policy association modification procedure, in accordance with an embodiment.

The present specification also proposes an amended SM Policy association modification procedure initiated by the PCF, as FIG. 5 illustrates.

Action 1. The PCF receives an internal or external trigger to re-evaluate PCC Rules and policy decision for a PDU Session. Possible external trigger events may be anyone of: i) the UDR notifies the PCF about a policy subscription change, e.g. change in the OperatorSpecificData resource. The notification of the change includes only the OperatorSpecificDataContainer where the change occurs (instead sending all the OperatorSpecificDataContainer entries of the map). If a change occurs simultaneously in more than one OperatorSpecificDataContainer, separate notifications are sent, one per entry; and ii) the CHF provides a Spending Limit Report to the PCF. This action has been labelled S-500 to be further referred to.

Action 2. If the PCF determines that the policy decision depends on the status of the policy counters available at the CHF and such reporting is not established for the subscriber, the PCF initiates an Initial Spending Limit Report. If policy counter status reporting is already established for the subscriber, and the PCF decides to modify the list of subscribed policy counters, the PCF sends an Intermediate Spending Limit Report. If the PCF decides to unsubscribe any future status notification of policy counters, it sends a Final Spending Limit Report Request to cancel the request for reporting the change of the status of the policy counters available at the CHF.

Action 3. The PCF makes a policy decision. The PCF can determine that updated or new policy information need to be sent to the SMF.

Action 4. The PCF invokes the Npcf_SMPolicyControl_UpdateNotify service operation by sending the HTTP POST request with "{Notification URI}/update" as the resource URI to the SMF that has previously subscribed. The request operation provides the PDU session ID and the updated policies, as described in subclause 4.2.4 of 3GPP TS 29.512.

Action 5. The SMF sends an HTTP "200 OK" to the PCF.

On the other hand, regarding the UE Policy association establishment procedure in a Roaming scenario discussed above with reference to FIG. 3, the present specification proposes amendments discussed in the following.

In action 9, the V-PCF does not need to query V-UDR per each UE Policy Control association for a given PLMN. Or the data are read and subscribed at the V-PCF start-up, or delayed until the first occurrence of the UE Policy Control association for that PLMN.

In a similar way, the V-PCF does not need to send an unsubscription message for each UE Policy Control association termination for that PLMN, (not shown in this drawing).

Figure 6:
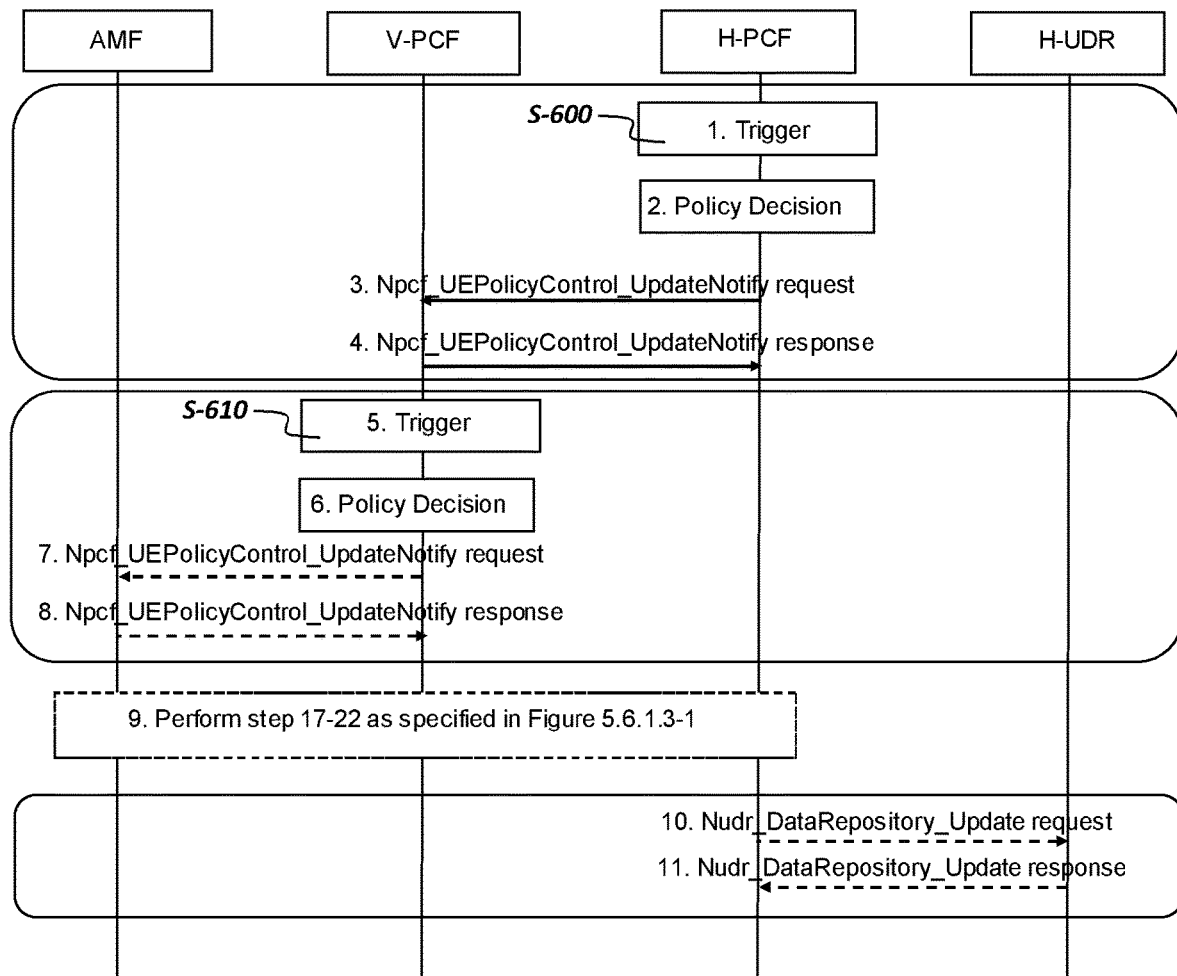
FIG. 6 illustrates an exemplary sequence of actions carried out during a PCF-initiated UE Policy association modification procedure in a Roaming scenario, in accordance with an embodiment.

The present specification also proposes an amended UE Policy association modification procedure in a Roaming scenario and initiated by the PCF, as FIG. 6 illustrates.

In this amended procedure further discussed, if the H-PCF receives a trigger, actions 1 to 4 and 10 to 11 are executed and actions 5 to 8 are omitted; whereas, if the V-PCF receives a trigger, actions 1 to 4 and 10 to 11 are omitted and actions 5 to 8 are executed.

Action 1. The H-PCF receives an external trigger, e.g. the subscriber policy data of a UE is changed, or the PCF receives an internal trigger, e.g. operator policy is changed, to re-evaluate UE policy decision for a UE. This action has been labelled S-600 to be further referred to.

Action 2. The H-PCF makes the policy decision including the applicable updated Policy Control Request Trigger(s) and/or updated UE Policy.

Action 3. The H-PCF invokes the Npcf_UEPolicyControl_UpdateNotify service operation by sending an HTTP POST request to the resource URI "{Notification URI}/update" with the updated UE policy and/or Policy Control Request Trigger(s) if applicable.

Action 4. The V-PCF sends an HTTP "204 No Content" response to the H-PCF.

Action 5. The V-PCF receives an external trigger, e.g. operator policy in the V-UDR for the PLMN ID of this UE is changed, or the V-PCF receives an internal trigger, e.g. local policy is changed, to re-evaluate UE policy decision for a UE. This action has been labelled S-610 to be further referred to.

NOTE: To protect against the potential increase in signalling load, careful consideration of the network load is necessary for the update of UE Policies to the visiting roamers from a PLMN whose UePolicySet values changed, e.g. limiting the number of visiting UEs subject to simultaneous updates and distributing the whole base of visited UEs from the modified PLMN in a dispersion interval.

Action 6. The V-PCF makes the policy decision including the applicable updated Policy Control Request Trigger(s) and/or updated UE Policy. The V-PCF checks if the size of determined UE policy and received UE policy from H-PCF in action 3 exceeds a predefined limit.

Action 7. If the V-PCF needs to update the Policy Control Request Trigger(s) or forward the Policy Control Request Trigger(s) received from the H-PCF in action 3, the V-PCF shall invoke the Npcf_UEPolicyControl_UpdateNotify service operation by sending an HTTP POST request to the resource URI "{Notification URI}/update".

Action 8. The AMF sends an HTTP "204 No Content" response to the PCF.

Figure 3:
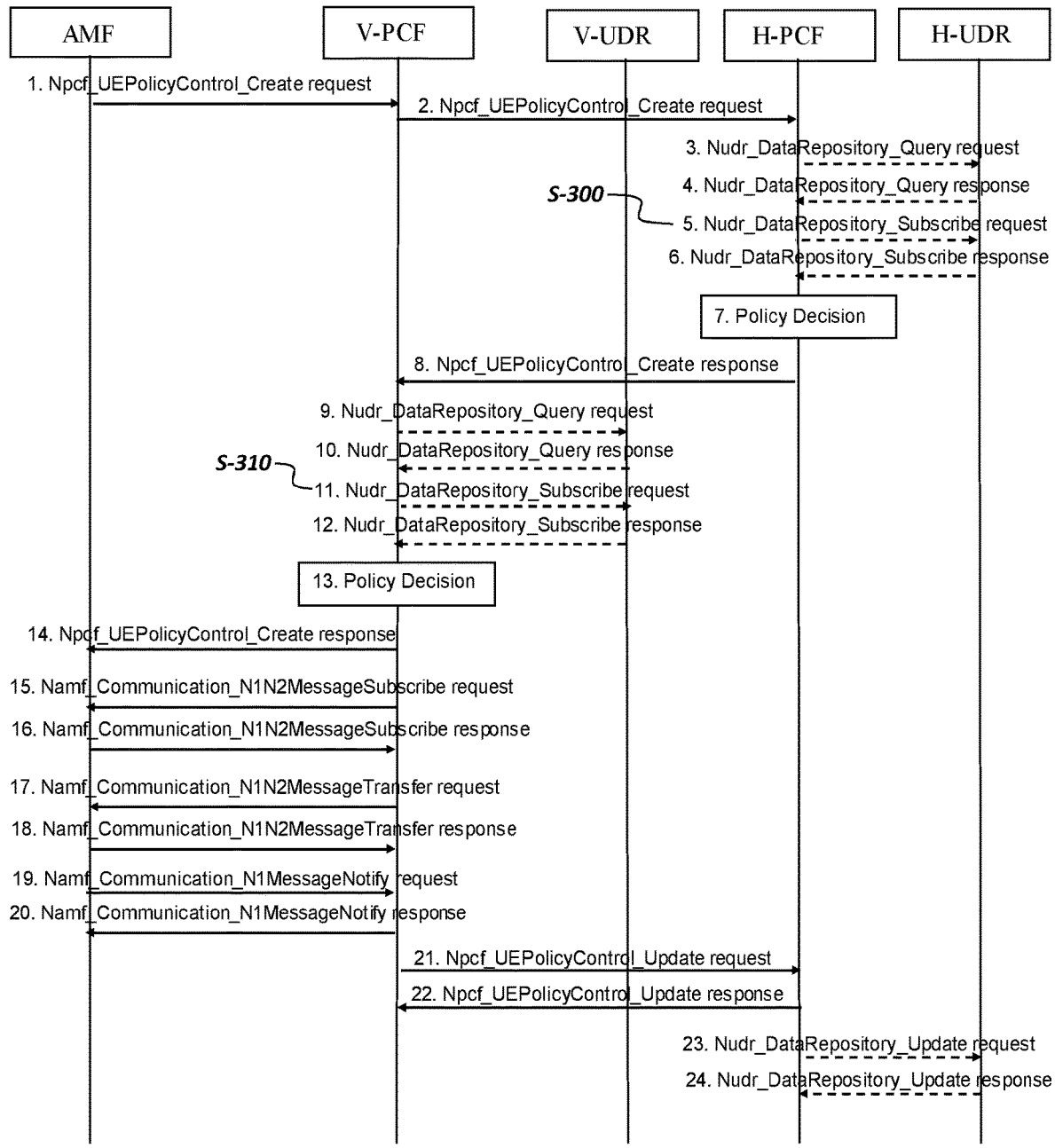
FIG. 3 illustrates a sequence of actions carried out during a UE Policy association establishment procedure in a Roaming scenario.
Figure 4:
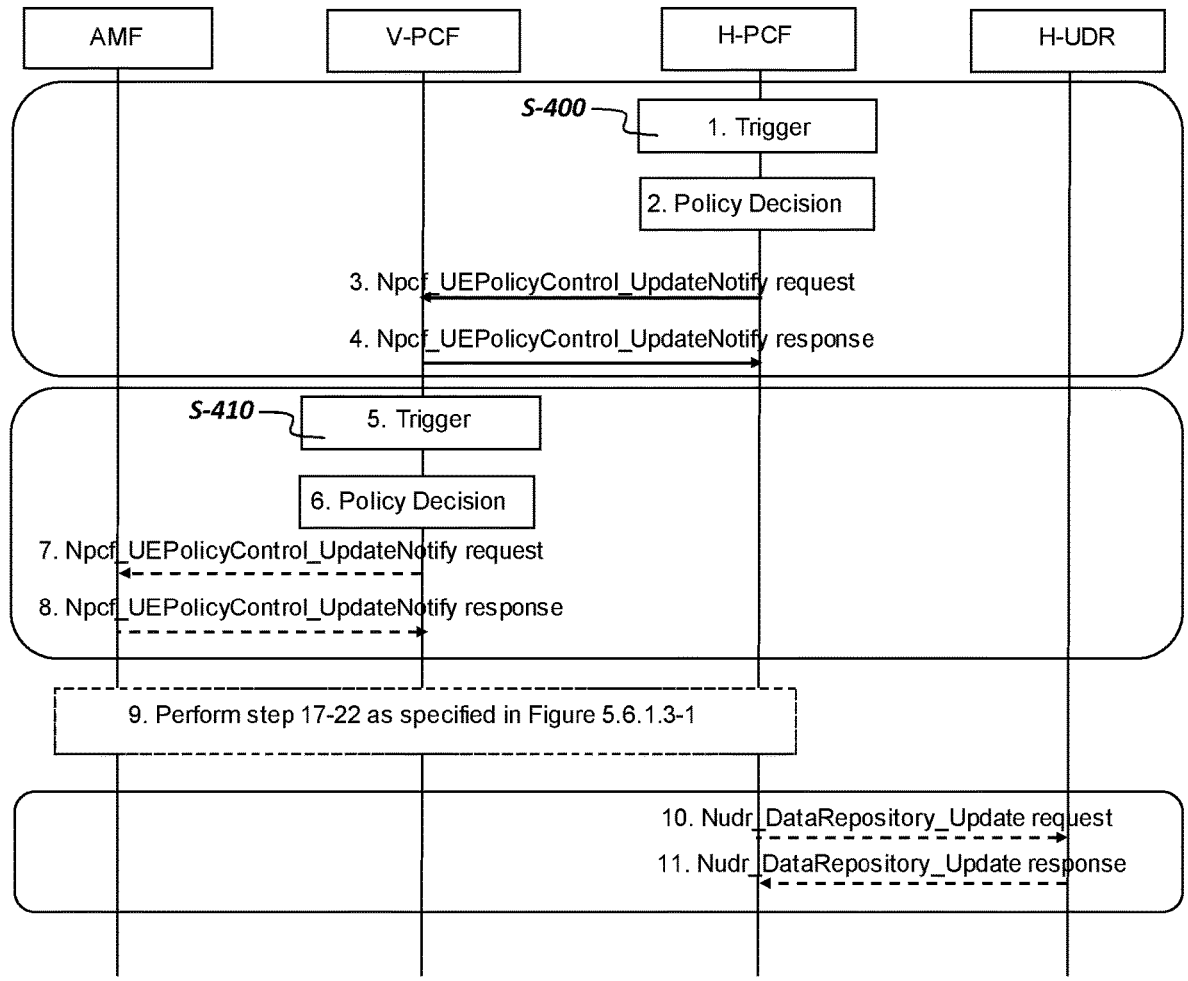
FIG. 4 illustrates a sequence of actions carried out during a UE Policy association modification procedure in a Roaming scenario.

Action 9. If the V-PCF decided to update the UE policy in action 6 or the V-PCF received the UE Policy in action 3, actions 17-22 as specified in FIG. 3 are executed.

Action 10-11. If the H-PCF decided to update the UE policy in action 2, other conventional actions may be executed.

Still with reference to the amended UE Policy association modification procedure in a Roaming scenario illustrated in FIG. 6, further embodiments are discussed in the following.

In action 5, i.e. step S-610, one of the possible triggers is a change of the information in the V-UDR for the resource PlmnUePolicySet for a given PLMN-Id.

If the embodiment of the amended UE Policy association establishment procedure in a Roaming scenario, discussed above with reference to FIG. 3, is carried out, there will be just one subscription to changes from the V-PCF to the UDR, so if this data changes, the UDR just sends one notification to the V-PCF. Then, upon the reception of this notification, the V-PCF may identify all the UE Policy associations established for UEs belonging to the notified PLMN, and may execute actions 6, 7, 8 for every UE Policy association.

In the following, changes proposed for 3GPP TS 29.519 v15.3.0 are discussed.

A first change affects Table 5.4.2.10-1 in section 5.4.2.10 Type PolicyDataSubscription, which may be amended as disclosed in Table III above, and as illustrated in FIG. 13, wherein the attribute "monitoredResourceUris" 130 is clarified with a NOTE 132 indicating that a modification in the PolicyDataSubscriptions resource 150 (in prior art FIG. 15) and in the IndividualPolicyDataSubscription resource 152 (in prior art FIG. 15) shall not trigger a notification. This NOTE 32 also indicates that the resource URI of the IndividualPolicyDataSubscription resource and the resource URI of the PolicyDataSubscriptions resource shall not be included in the "monitoredResourceUris" attribute.

A second change affects Table 5.4.2.11-1 in section 5.4.2.11 Type PolicyDataChangeNotification, which may be amended as disclosed in Table IV above, and as illustrated in FIG. 14, wherein new attributes are proposed, such as any one of "plmnUePolicySet" 140, "opSpecData" 142 and "plmnId" 144. Table IV above also discloses an amended NOTE illustrated as NOTE 146 in FIG. 14.

A third change affects sections A.2, wherein the following amendment is proposed:

PolicyDataChangeNotification:
  description: Contains changed policy data for which notification was requested.
  type: object

```
   properties:
      amPolicyData:
         $ref: '#/components/schemas/AmPolicyData'
      uePolicySet:
         $ref: '#/components/schemas/UePolicySet'
      plmnUePolicySet:
         $ref: '#/components/schemas/UePolicySet'
      smPolicyData:
         $ref: '#/components/schemas/SmPolicyData'
      usageMonData:
         $ref: '#/components/schemas/UsageMonData'
      SponsorConnectivityData:
         $ref: '#/components/schemas/SponsorConnectivityData'
      bdtData:
         $ref: '#/components/schemas/BdtData'
      opSpecData:
         type: object
         additionalProperties:
            $ref:
'TS29505_Subscription_Data.yaml#/components/schemas/OperatorSpecificDataContainer'
         minProperties: 1
      ueId:
         $ref: 'TS29571_CommonData.yaml#/components/schemas/VarUeId'
      sponsorId:
         type: string
      bdtRefId:
         type: string
      usageMonId:
         type: string
      plmnId:
         $ref: 'TS29571_CommonData.yaml#/components/schemas/PlmnId'
```

Figure 7:
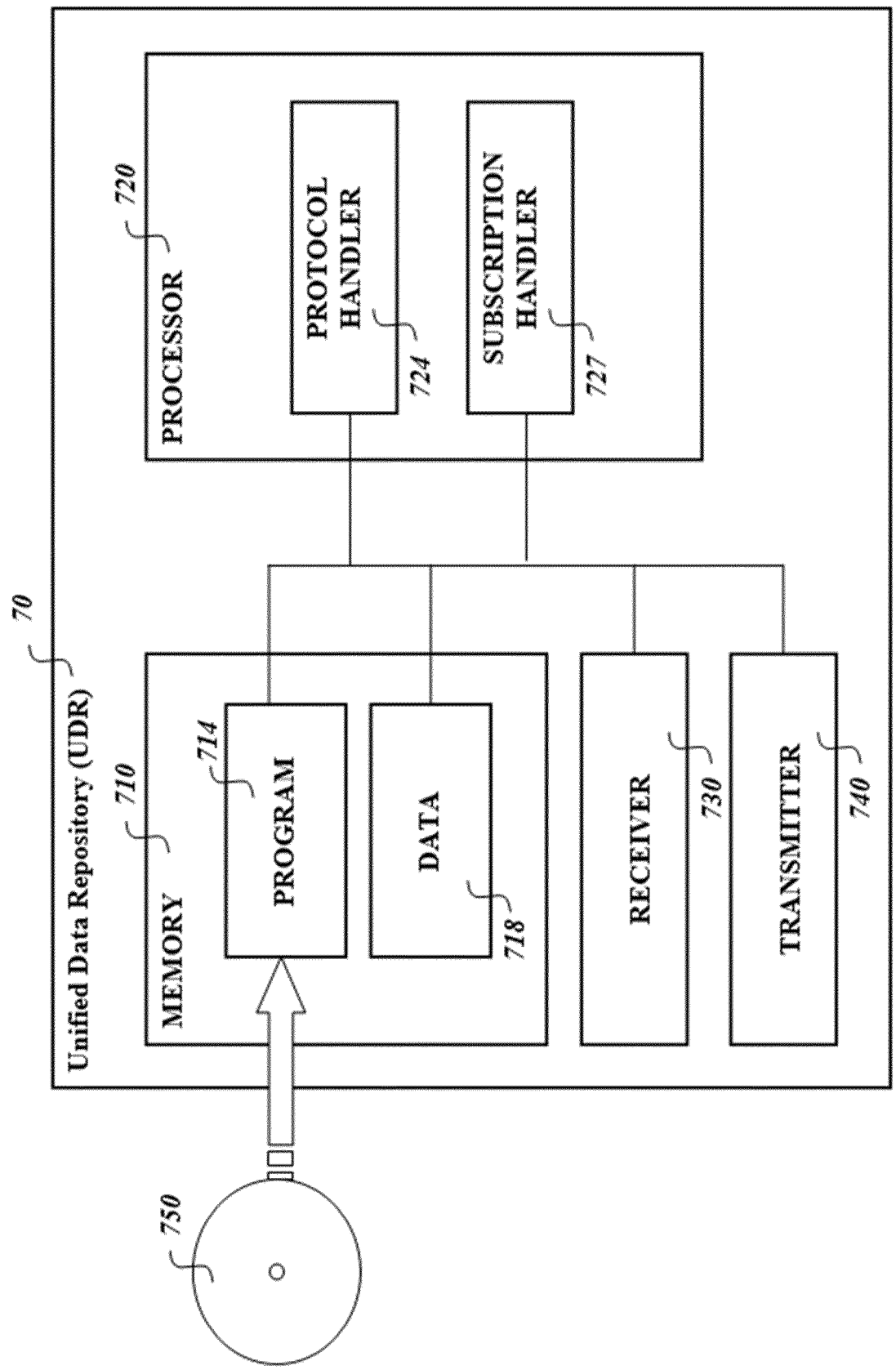
FIG. 7 shows a basic component structure of a User Data Repository (UDR), in accordance with an embodiment.
Figure 10:
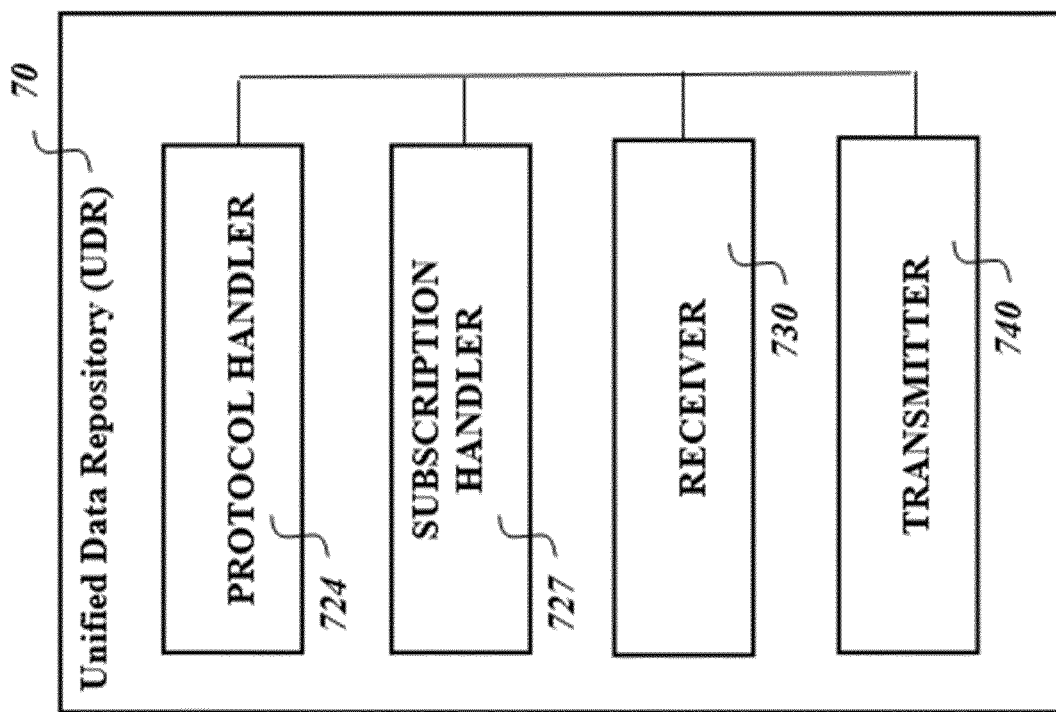
FIG. 10 shows a basic component structure of a UDR in accordance with another embodiment.

In order to carry out sequences of actions disclosed above with reference to any one of FIG. 1 to FIG. 6, different embodiments of a UDR 70 are illustrated in FIG. 7 and FIG. 10.

In accordance with an embodiment illustrated in FIG. 7, the UDR 70 may comprise at least one processor 720, and at least one memory 710 that stores processor-executable instructions 714. In this UDR, the at least one processor interfaces with the at least one memory to execute the processor-executable instructions, whereby the UDR is operable to perform the actions disclosed above and involving the UDR.

To this end, this UDR illustrated in FIG. 7 may also be operable to receive messages, via receiver 730 from other network nodes, and transmit messages, via transmitter 740 toward other network nodes.

In an embodiment, a protocol handler 724 running in a processor 720 may control the transmitter 740 and receiver 730 for transmission and reception of messages, whereas a subscription handler 727 running in the processor 720 may handle the logic related to subscriptions and notifications.

If required at all, the UDR 70, illustrated in FIG. 7, may be complemented with a data section 718 in memory to store any necessary data to handle subscriptions to notifications.

The UDR illustrated in FIG. 7 may thus comprise the at least one processor 720 and the at least one memory 710, both in communication with each other, with the protocol handler 724, the subscription handler 727, the receiver 730 and the transmitter 740, and with other elements or units of the UDR. The at least one memory 710 may comprise volatile and/or non-volatile memory. In particular, the at least one memory 710 may have a computer program 714 and data 718 stored therein. The computer program 714 may be loaded in the at least one memory 710 from a computer program product 750, such as any non-transitory computer readable medium, in which the computer program is stored. The data 718 may comprise any necessary data to handle subscriptions to notifications. The at least one processor 720 may be configured to carry out the functions of the protocol handler 724 and the subscription handler 727.

In accordance with another embodiment illustrated in FIG. 10, the UDR 70 is operable to perform the actions disclosed above and involving the UDR.

To this end, this UDR illustrated in FIG. 10 may also be operable to receive messages, via receiver 730 from other network nodes, and transmit messages, via transmitter 740 toward other network nodes.

The UDR 70 illustrated in FIG. 10 may comprise a subscription handler 727 operable to handle the logic related to subscriptions and notifications, and a protocol handler 724 operable to control the transmitter 740 and receiver 730 for transmission and reception of messages.

Figure 8:
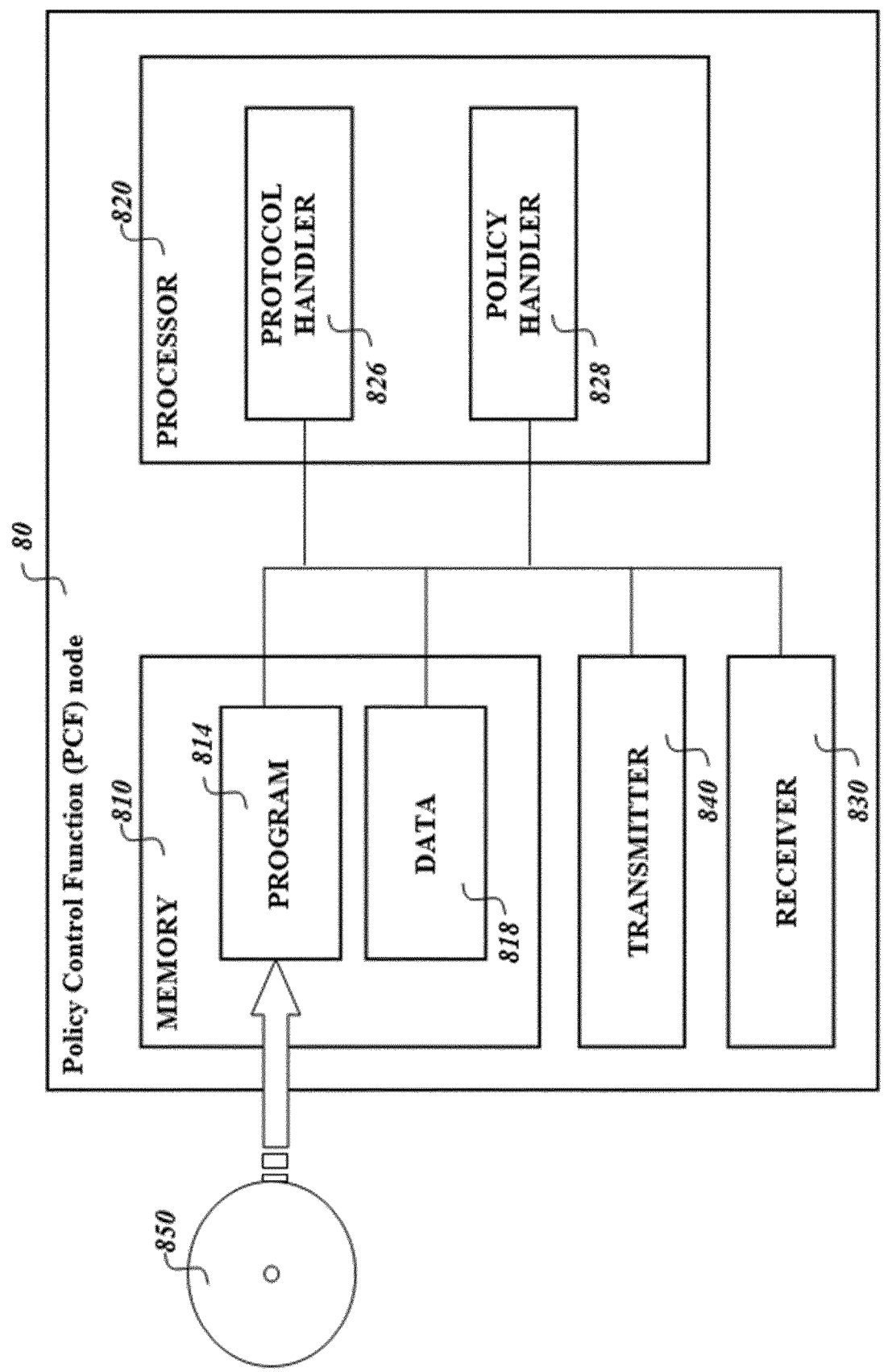
FIG. 8 shows a basic component structure of a Policy Control Function (PCF) node, in accordance with an embodiment.
Figure 11:
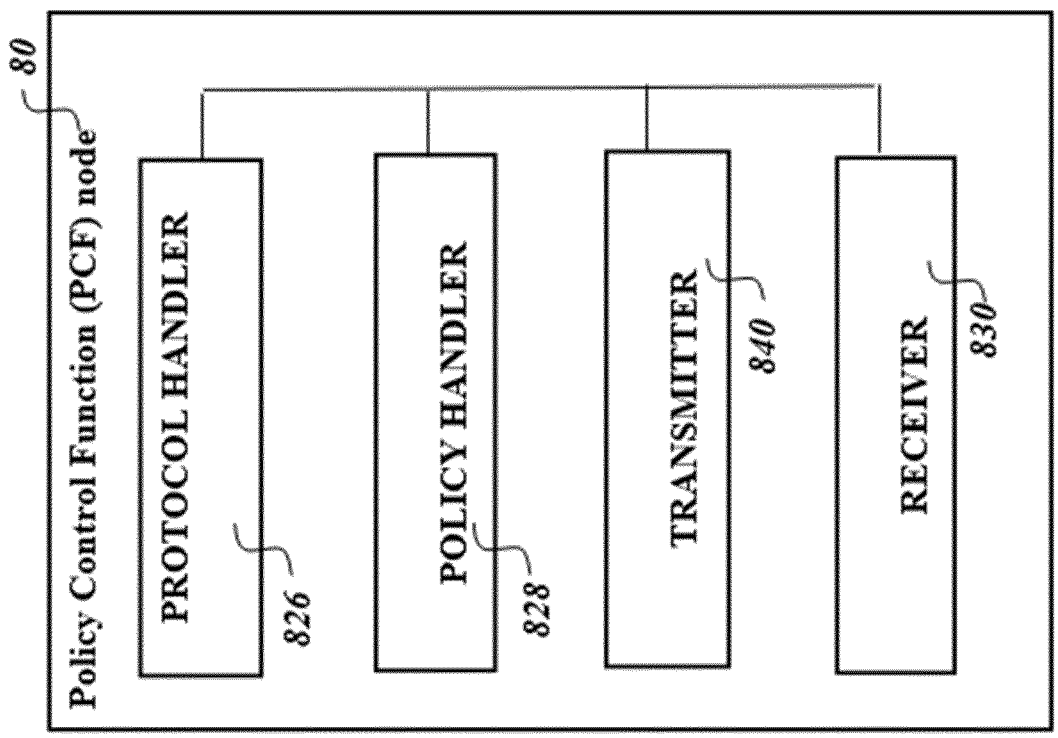
FIG. 11 shows a basic component structure of a PCF node in accordance with another embodiment.

In order to carry out sequences of actions disclosed above with reference to any one of FIG. 1 to FIG. 6, different embodiments of a PCF node 80 are illustrated in FIG. 8 and FIG. 11.

In accordance with an embodiment illustrated in FIG. 8, the PCF node 80 may comprise at least one processor 820, and at least one memory 810 that stores processor-executable instructions 814. In this PCF node, the at least one processor interfaces with the at least one memory to execute the processor-executable instructions, whereby the PCF node is operable to perform the actions disclosed above and involving the PCF node.

To this end, this PCF node illustrated in FIG. 8 may also be operable to receive messages, via receiver 830 from other network nodes, and transmit messages, via transmitter 840 toward other network nodes.

In an embodiment, a protocol handler 826 running in a processor 820 may control the transmitter 840 and receiver 830 for transmission and reception of messages, whereas a policy handler 828 running in the processor 820 may handle the logic related to policies and subscriptions to notifications.

If required at all, the PCF node 80, illustrated in FIG. 8, may be complemented with a data section 818 in memory to store any necessary data to handle policies and subscriptions to notifications.

The PCF node illustrated in FIG. 8 may thus comprise the at least one processor 820 and the at least one memory 810, both in communication with each other, with the protocol handler 826, the policy handler 828, the receiver 830 and the transmitter 840, and with other elements or units of the PCF node. The at least one memory 810 may comprise volatile and/or non-volatile memory. In particular, the at least one memory 810 may have a computer program 814 and data 818 stored therein. The computer program 814 may be loaded in the at least one memory 810 from a computer program product 850, such as any non-transitory computer readable medium, in which the computer program is stored. The data 818 may comprise any necessary data to handle policies and subscriptions to notifications. The at least one processor 820 may be configured to carry out the functions of the protocol handler 826 and the policy handler 828.

In accordance with another embodiment illustrated in FIG. 11, the PCF node 80 is operable to perform the actions disclosed above and involving the PCF node.

To this end, this PCF node illustrated in FIG. 11 may also be operable to receive messages, via receiver 830 from other network nodes, and transmit messages, via transmitter 840 toward other network nodes.

The PCF node 80 illustrated in FIG. 11 may comprise a policy handler 828 operable to handle the logic related to policies and subscriptions to notifications, and a protocol handler 826 operable to control the transmitter 840 and receiver 830 for transmission and reception of messages.

Figure 9:
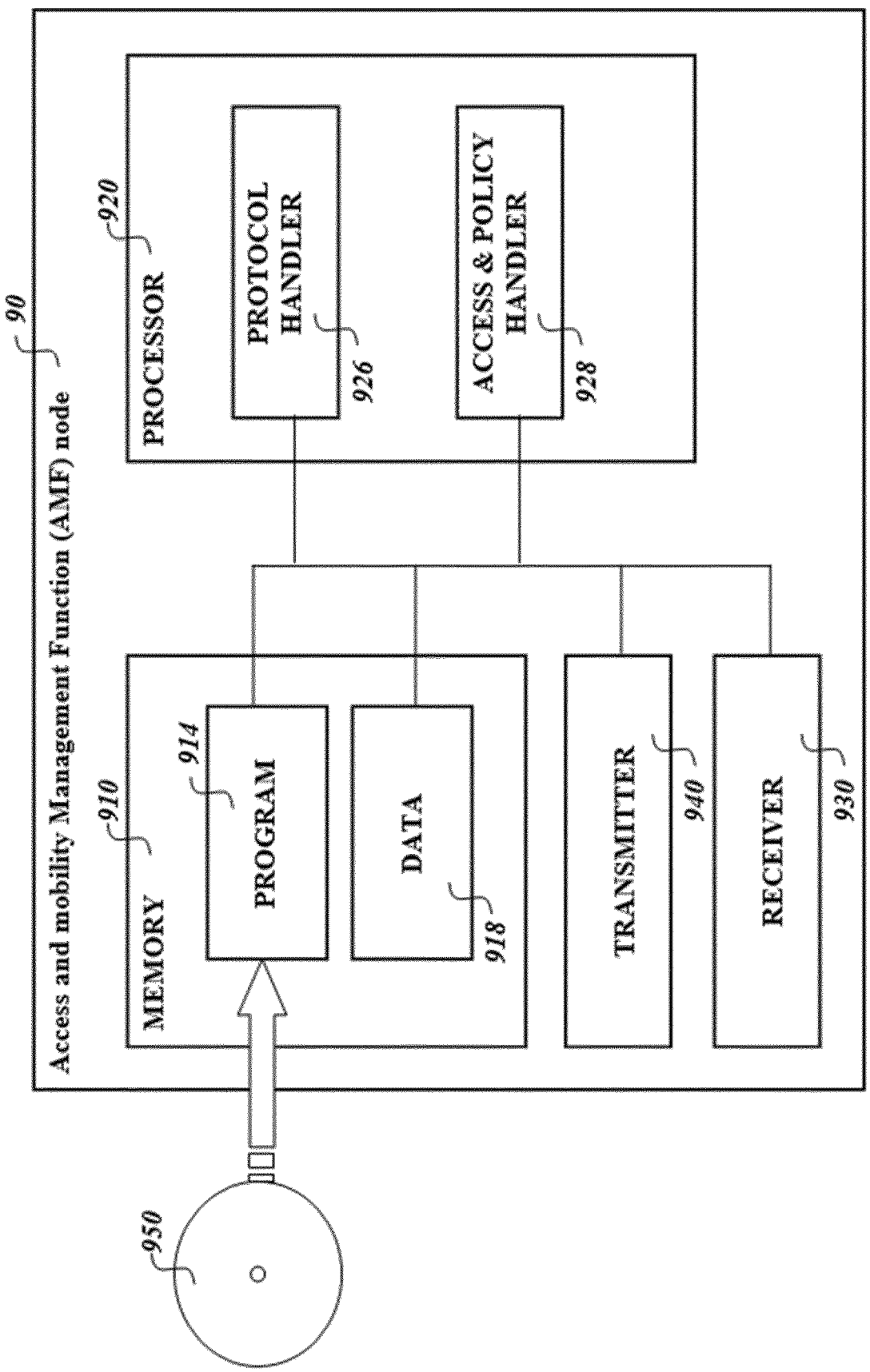
FIG. 9 shows a basic component structure of an Access and mobility Management Function (AMF) node, in accordance with an embodiment.
Figure 12:
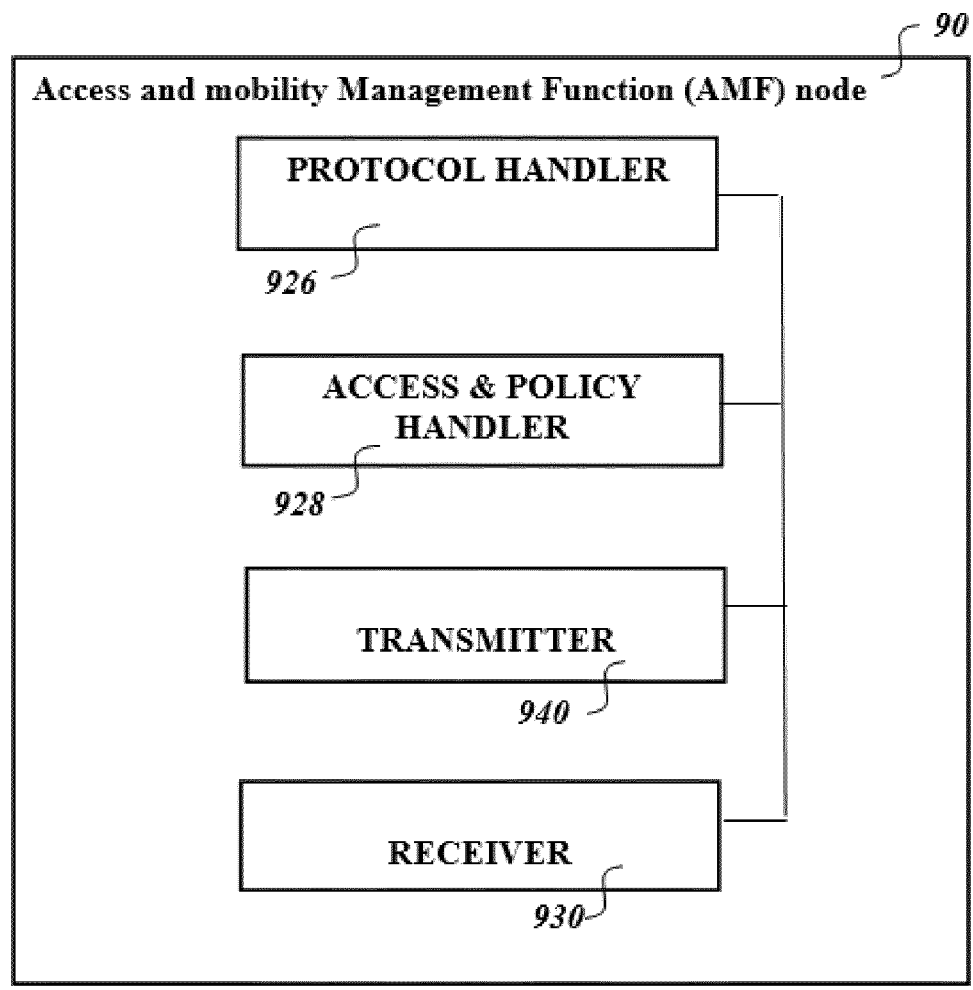
FIG. 12 shows a basic component structure of an AMF node in accordance with another embodiment.

In order to carry out sequences of actions disclosed above with reference to any one of FIG. 1 to FIG. 6, different embodiments of an AMF node 90 are illustrated in FIG. 9 and FIG. 12.

In accordance with an embodiment illustrated in FIG. 9, the AMF node 90 may comprise at least one processor 920, and at least one memory 910 that stores processor-executable instructions 914. In this AMF node, the at least one processor interfaces with the at least one memory to execute the processor-executable instructions, whereby the AMF node is operable to perform the actions disclosed above and involving the AMF node.

To this end, this AMF node illustrated in FIG. 9 may also be operable to receive messages, via receiver 930 from other network nodes, and transmit messages, via transmitter 940 toward other network nodes.

In an embodiment, a protocol handler 926 running in a processor 920 may control the transmitter 940 and receiver 930 for transmission and reception of messages, whereas an access and policy handler 928 running in the processor 920 may handle the logic related to accesses and policies.

If required at all, the AMF node 90, illustrated in FIG. 9, may be complemented with a data section 918 in memory to store any necessary data to handle accesses and policies.

The AMF node illustrated in FIG. 9 may thus comprise the at least one processor 920 and the at least one memory 910, both in communication with each other, with the protocol handler 926, the access and policy handler 928, the receiver 930 and the transmitter 940, and with other elements or units of the AMF node. The at least one memory 910 may comprise volatile and/or non-volatile memory. In particular, the at least one memory 910 may have a computer program 914 and data 918 stored therein. The computer program 914 may be loaded in the at least one memory 910 from a computer program product 950, such as any non-transitory computer readable medium, in which the computer program is stored. The data 918 may comprise any necessary data to handle the accesses and policies. The at least one processor 920 may be configured to carry out the functions of the protocol handler 926 and the access and policy handler 928.

In accordance with another embodiment illustrated in FIG. 12, the AMF node 90 is operable to perform the actions disclosed above and involving the AMF node.

To this end, this AMF node illustrated in FIG. 12 may also be operable to receive messages, via receiver 930 from other network nodes, and transmit messages, via transmitter 940 toward other network nodes.

The AMF node 90 illustrated in FIG. 12 may comprise an access and policy handler 928 operable to handle the logic related to accesses and policies, and a protocol handler 926 operable to control the transmitter 840 and receiver 830 for transmission and reception of messages.

The invention may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer. The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method for notifying a Network Function, NF, service consumer hosted on a network node of a policy data modification, the method comprising:
   receiving, at a Unified Data Repository, UDR, NF, from the NF service consumer hosted on the network node, a subscription request to a notification notifying the NF service consumer hosted on the network node of the policy data modification;
   determining, at the UDR NF, the policy data modification, the policy data modification being for a Public Land Mobile Network, PLMN, user equipment, UE, Policy Set; and
   transmitting, from the UDR NF to the NF service consumer hosted on the network node that has subscribed to the notification of the policy data modification, the notification notifying the NF service consumer of the policy data modification for
   the PLMN UE Policy Set, along with a PLMN identifier.

2. The method of claim 1, the method further comprising:
   detecting the policy data modification for:
   the PLMN UE Policy Set.

3. The method of claim 1, the method further comprising:
   supporting a data type Policy Data Change Notification that contains changed policy data for which the notification was requested, wherein a data structure of the data type Policy Data Change Notification comprises:
   the PLMN UE Policy Set, along with the PLMN identifier.

4. The method of claim 1, the method further comprising:
   holding a first resource for Policy Data Subscriptions and a second resource for Individual Policy Data Subscription, wherein the first resource is used to represent subscriptions to the notification of the policy data modification and the second resource being used to represent an individual subscription to the notification of the policy data modification;

supporting a second data type Policy Data Subscription that identifies a subscription to the notification of the policy data modification, wherein a data structure of the second data type Policy Data Subscription comprises a set of URIs that identify resources for which the policy data modification triggers the notification;

wherein a first policy data modification in the first resource for the Policy Data Subscriptions is excluded from the notification; and wherein a second policy data modification in the second resource for the Individual Policy Data Subscription is excluded from the notification.

5. A Unified Data Repository, UDR, network function, NF, for notifying a NF service consumer hosted on a network node of a policy data modification, the UDR comprising processing circuitry configured to:

receive, from the NF service consumer hosted on the network node, a subscription request to a notification notifying the NF service consumer hosted on the network node of the policy data modification;

determine the policy data modification, the policy data modification being for a Public Land Mobile Network, PLMN, user equipment, UE, Policy Set; and transmit, to the NF service consumer hosted on the network node that has subscribed to the notification of the policy data modification, the notification notifying the NF service consumer of the policy data modification for:

the PLMN UE Policy Set, along with a PLMN identifier.

6. The UDR of claim 5, wherein the processing circuitry is further configured to:

detect the policy data modification for the PLMN UE Policy Set.

7. The UDR of claim 5, wherein the processing circuitry is further configured to:

support a data type Policy Data Change Notification that contains changed policy data for which the notification was requested, wherein a data structure of the data type Policy Data Change Notification comprises the PLMN UE Policy Set, along with the PLMN identifier.

8. The UDR of claim 5, the processing circuitry is further configured to:

hold a first resource for Policy Data Subscriptions and a second resource for Individual Policy Data Subscription, wherein the first resource is used to represent subscriptions to the notification of the policy data modification and the second resource is used to represent an individual subscription to the notification of the policy data modification;

support a second data type Policy Data Subscription that identifies a subscription to the notification of the policy data modification, wherein a data structure of the second data type Policy Data Subscription comprises a set of URIs that identify resources for which the policy data modification triggers a notification;

wherein a first policy data modification in the first resource for Policy Data Subscriptions is excluded from the notification; and wherein a second policy data modification in the second resource for Individual Policy Data Subscription is excluded from the notification.

9. A system comprising a Unified Data Repository, UDF, network function, NF, and a network node hosting a Network Function, NF, service consumer for being notified from a Unified Data Repository, UDR, of a policy data modification, the network node hosting the NF service consumer comprising processing circuitry configured to:

transmit, to the UDR, a subscription request, from the NF service consumer hosted on the network node, a notification notifying the NF service consumer hosted on the network node of the policy data modification for a Public Land Mobile Network, PLMN, user equipment, UE, Policy Set to allow the UDR to determine the policy data modification;

receive, from the UDR, the notification for the NF service consumer hosted on the network node that has subscribed to the notification of the policy data modification, the notification notifying the NF service consumer of the policy data modification for the PLMN UE Policy Set, along with a PLMN identifier; and the UDR comprising processing circuitry configured to:

receive, from the NF service consumer hosted on the network node, the subscription request to the notification notifying the NF service consumer hosted on the network node of the policy data modification;

determine the policy data modification, the policy data modification being for the PLMN UE Policy Set; and transmit, to the NF service consumer hosted on the network node that has subscribed to the notification of the policy data modification, the notification notifying the NF service consumer of the policy data modification for the PLMN UE Policy Set, along with the PLMN identifier.

10. The network node of claim 9, wherein the processing circuitry of the network node hosting the NF service consumer is further configured to:

subscribe, to the UDR, to the notification of the policy data modification by transmitting the subscription request with a set of URIs that identify resources for which the policy data modification triggers the notification;

wherein the URI that identifies a resource for Policy Data Subscriptions is excluded in the set of URIs for a subscription to the notification; and wherein the URI that identifies a resource for Individual Policy Data Subscription is excluded in the set of URIs for the subscription to the notification.

11. A method for notifying a Network Function, NF, service consumer hosted on a network node from a Unified Data Repository, UDR, NF of a policy data modification, the method being carried out by the network node hosting the NF service consumer and the UDR NF, the method comprising:

transmitting, to the UDR, a subscription request, from the NF service consumer hosted on the network node, to a notification notifying the NF service consumer hosted on the network node of the policy data modification for a Public Land Mobile Network, PLMN, user equipment, UE, Policy Set to allow the UDR to determine the policy data modification;

receiving, at the UDR NF from the NF service consumer hosted on the network node, the subscription request to the notification notifying the NF service consumer hosted on the network node of the policy data modification;

determining, by the UDR NF, the policy data modification, the policy data modification being for the PLMN UE Policy Set;

transmitting, from the UDR NF to the NF service consumer hosted on the network node that has subscribed to the notification of the policy data modification, the notification notifying the NF service consumer of the policy data modification for the PLMN UE Policy Set, along with a PLMN identifier; and receiving, by the NF service consumer hosted on the network node, from the UDR, the notification for the NF service consumer hosted on the network node that has subscribed to the notification of the policy data modification, the notification notifying the NF service consumer of the policy data modification for the PLMN UE Policy Set, along with the PLMN identifier.

12. The method of claim 11, the method further comprising:

subscribing, by the network node hosting the NF service consumer to the UDR, to the notification of the policy data modification by transmitting the subscription request with a set of URIs that identify resources for which the policy data modification triggers the notification;

wherein the URI that identifies a resource for Policy Data Subscriptions is excluded in the set of URIs for a subscription to the notification; and wherein the URI that identifies a resource for Individual Policy Data Subscription is excluded in the set of URIs for the subscription to the notification.

\* \* \* \* \*